A. W. BUELL.
HAND RAKE.
APPLICATION FILED JUNE 15, 1912.
1,072,568.
Patented Sept. 9, 1913.
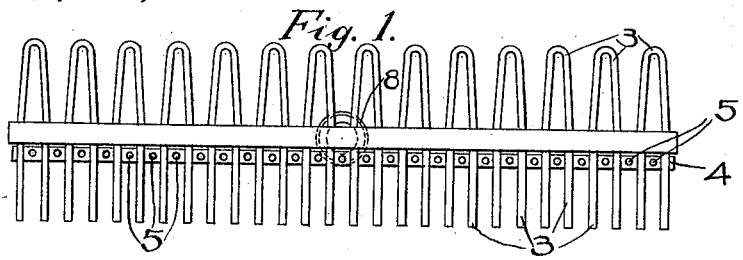
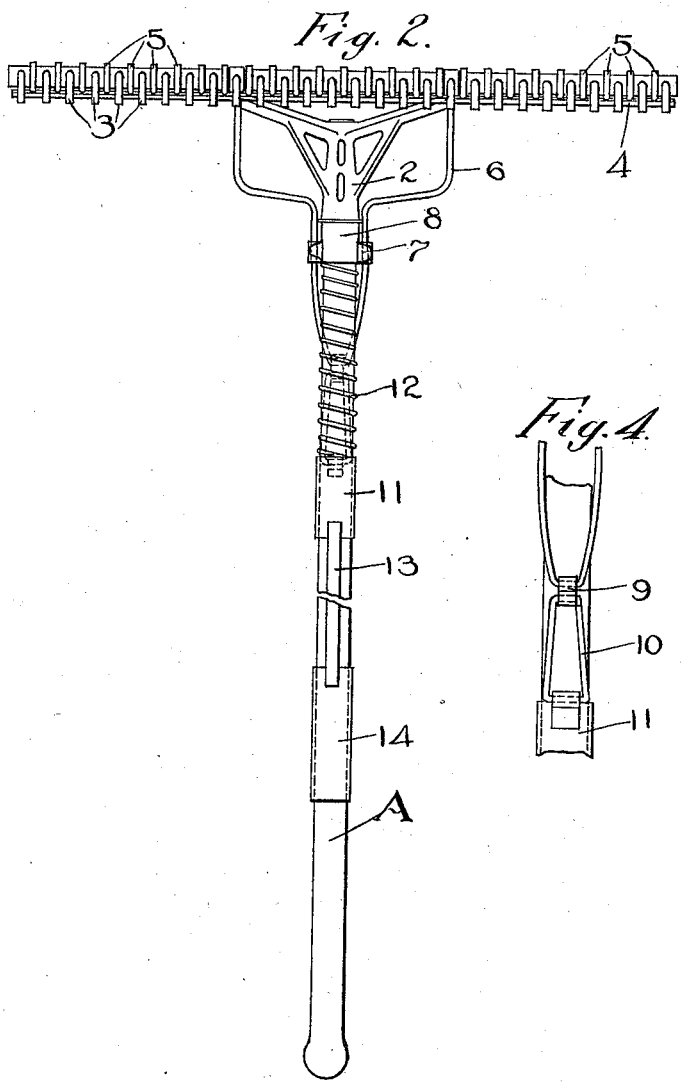
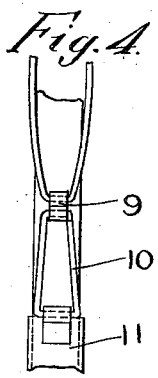
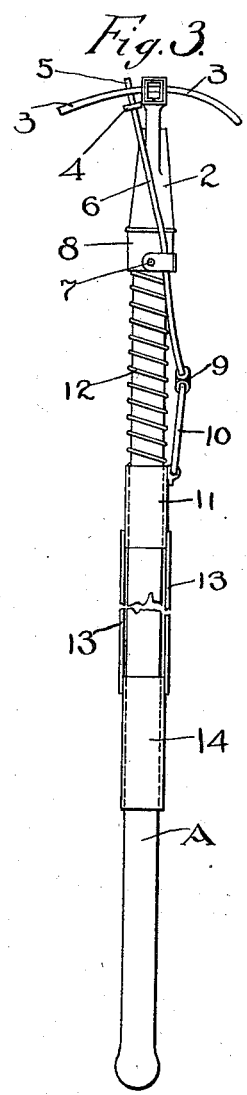
Witnesses
Walter D[illegible]
D. Smith
Inventor
Albert W. Buell
By Lothrop Johnson
his Attorneys

UNITED STATES PATENT OFFICE.

ALBERT W. BUELL, OF ST. PAUL, MINNESOTA, ASSIGNOR TO MELVILLE H. O. FISHER, OF ST. PAUL, MINNESOTA.

HAND-RAKE.

1,072,568.  Specification of Letters Patent.  Patented Sept. 9, 1913.

Application filed June 15, 1912. Serial No. 703,913.

*To all whom it may concern:*

Be it known that I, ALBERT W. BUELL, a citizen of the United States, residing at St. Paul, in the county of Ramsey and State of Minnesota, have invented certain new and useful Improvements in Hand-Rakes, of which the following is a specification.

My invention relates to improvements in hand rakes, its object being particularly to provide improved means for combing any collection from the rake teeth.

To this end the invention consists in the features of construction, combination, and arrangement of parts hereinafter described and claimed.

In the accompanying drawings forming part of this specification, Figure 1 is an elevation of the tooth end of a rake embodying my features of invention; Fig. 2 is a plan view of the rake; Fig. 3 is a side elevation; and Fig. 4 is a detail broken away of part of the operating mechanism of the tooth cleaner.

Referring to the drawings A represents a rake handle carrying at one end a head 2 forming a support for ordinary rake teeth 3. For the purpose of cleaning the rake teeth I provide a comb consisting of a stripper bar 4 extending across the inner sides of the teeth below the rake head, said stripper bar carrying a plurality of teeth 5 projecting forwardly between the rake teeth. The stripper bar 4 is carried by a wire member 6 having fulcrum support 7 upon the sides of a collar 8 surrounding the rake handle. The inner end of the member 6 has hinge connection 9 with a link 10, said link being at its opposite end hinged upon the forward end of a collar 11 slidable upon the handle. A coil spring 12 surrounds the handle intermediate of the collars 8 and 11. The collar 11 has link connection 13 with a hand grip 14 slidable upon the free end of the handle.

In operation, with the handle in withdrawn position the comb or stripper bar 4 will stand in the position shown in Fig. 3 adjacent the supported centers of the rake teeth. By shoving the hand grip 14 forwardly upon the handle the member 6 will be turned upon its pivotal supports through the medium of the link 10 shoving the stripper bar downwardly upon the rake teeth to clean the same. The hand grip being released will cause the parts to be forced back into normal position through the medium of the coil spring 12. While I have shown the device arranged in connection with the rake teeth upon one side of the head I may duplicate the necessary parts to furnish a cleaning comb for the rake teeth upon both sides of the head. I have shown the hand grip 14 as a convenient means for actuating the comb, but I do not restrict myself to the particular construction shown, the scope of the invention being set forth in the following claims.

I claim as my invention:

1. In combination with a rake handle and supported teeth, a cleaning comb arranged in coöperation with said teeth, a supporting member for said comb fulcrumed upon the handle, a sleeve slidable upon the handle, a hinged member connecting said sleeve and supporting member, and a spring supported between said supporting member and sleeve.

2. In combination with a rake handle and supported teeth, a cleaning comb arranged in coöperation therewith, a sleeve secured upon the handle, a supporting member for said comb fulcrumed upon said sleeve, a slidable sleeve spaced from said fixed sleeve, a hinged member connecting said slidable sleeve and comb supporting member, and a spring surrounding said handle between said fixed and slidable sleeves.

In testimony whereof I affix my signature in presence of two witnesses.

ALBERT W. BUELL.

Witnesses:
 MARIE JARSHISHET,
 P. T. JACKSON.

---

Copies of this patent may be obtained for five cents each, by addressing the "Commissioner of Patents, Washington, D. C."